(12) United States Patent
Chen et al.

(10) Patent No.: US 8,557,477 B2
(45) Date of Patent: Oct. 15, 2013

(54) FUEL CELL STACK

(75) Inventors: Chi-Chang Chen, Changhua County (TW); Huan-Ruei Shiu, Penghu County (TW); Kuei-Han Chen, Taichung County (TW); FangHei Tsau, Kaohsiung County (TW); Wen-Chen Chang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 1085 days.

(21) Appl. No.: 12/497,532

(22) Filed: Jul. 2, 2009

(65) Prior Publication Data

US 2010/0143765 A1  Jun. 10, 2010

(30) Foreign Application Priority Data

Dec. 4, 2008 (TW) ................................ 97147161 A (51) Int. Cl.
*H01M 2/00* (2006.01)

(52) U.S. Cl.
USPC .......................................... 429/507; 429/456

(58) Field of Classification Search
None
See application file for complete search history.

(56) References Cited

U.S. PATENT DOCUMENTS

| | | | | |
|---|---|---|---|---|
| 2,688,497 A | * | 9/1954 | Brisack | 285/200 |
| 5,484,666 A | * | 1/1996 | Gibb et al. | 429/434 |
| 6,190,793 B1 | * | 2/2001 | Barton et al. | 429/470 |
| 6,248,466 B1 | * | 6/2001 | Takahashi et al. | 429/434 |
| 2003/0003330 A1 | * | 1/2003 | Ballantine et al. | 429/13 |
| 2003/0203270 A1 | * | 10/2003 | Rock | 429/37 |
| 2006/0024561 A1 | * | 2/2006 | Sato et al. | 429/38 |

* cited by examiner

*Primary Examiner* — Maria J Laios
(74) *Attorney, Agent, or Firm* — Jianq Chyun IP Office (57) ABSTRACT

A fuel cell stack including a first end plate, a second end plate, at least a fuel cell, a first current collector and a second current collector is provided. The first end plate includes a first end plate structure component, which is combined with a first end plate manifold component. The second end plate includes a second end plate structure component, which is combined with a second end plate manifold component. The first and the second end plate manifold components are placed between the first and the second end plate structure components, while the fuel cell is disposed between the first and the second end plate manifold components. The first current collector is disposed between the first end plate manifold component and the fuel cell. The second current collector is disposed between the second end plate manifold component and the fuel cell.

22 Claims, 10 Drawing Sheets

FUEL CELL STACK

CROSS-REFERENCE TO RELATED APPLICATION

This application claims the priority benefit of Taiwan application serial no. 97147161, filed on Dec. 4, 2008. The entirety of the above-mentioned patent application is hereby incorporated by reference herein and made a part of specification.

BACKGROUND OF THE INVENTION

1. Field of the Invention

The present invention relates to a fuel cell stack. More particularly, the present invention relates to a fuel cell stack having end plates with a high rigidity and a stable chemical/electrochemical characteristic.

2. Description of Related Art

Figure 1:
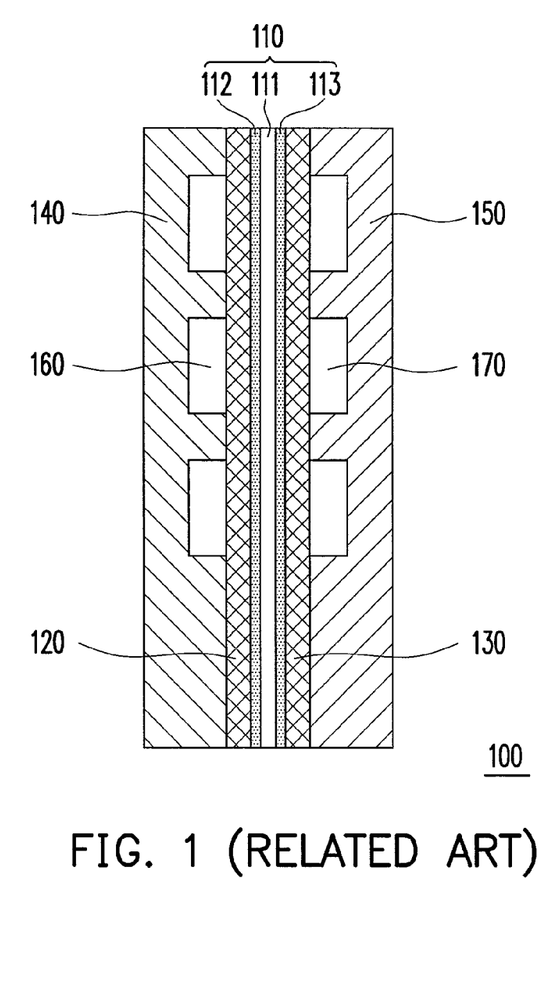
FIG. 1 is a schematic diagram illustrating a structure of a single fuel cell.

A proton exchange membrane fuel cell (PEMFC) is also referred to as a polymer electrolyte membrane fuel cell, and a constitution of a single fuel cell 100 is as that shown in FIG. 1, in which a central part is a membrane electrode assembly (MEA) 110, and gas diffusion layers (GDLs) 120 and 130 are disposed at two sides of the MEA 110, and are located between two bipolar plates 140 and 150. The MEA 110 is consisted of a proton exchange membrane 111 and catalyst layers 112 and 113 coated at two sides of the proton exchange membrane 111. After reaction fluid required by the fuel cell 100 is distributed by flow channels 160 and 170 in the bipolar plates and the GDLs 120 and 130, an electrochemical reaction is occurred at the catalyst layers 112 and 113. The reaction fluid required by an anode side of the fuel cell 100 is hydrogen or humid hydrogen, and when the reaction fluid contacts the catalyst layer 112 of the MEA 110 at the anode side, an oxidation reaction is occurred: $H_2 \rightarrow 2H^+ + 2e^-$. Electrons generated by the oxidation reaction are conducted by an external circuit, and hydrogen ions can pass through the proton exchange membrane 111 and get to a cathode side of the MEA 110, so that with assistance of humid oxygen or humid air at the cathode side, a reduction reaction: $O_2 + 4H^+ + 4e^- \rightarrow 2H_2O$ is occurred on the catalyst layer 113 of the MEA 110 at the cathode side. It should be noticed that the proton exchange membrane 111 is a membrane containing water, so that only the hydrogen ions can pass though the water molecules contained in the proton exchange membrane 111, and other gas molecules cannot pass there through.

Figure 2:
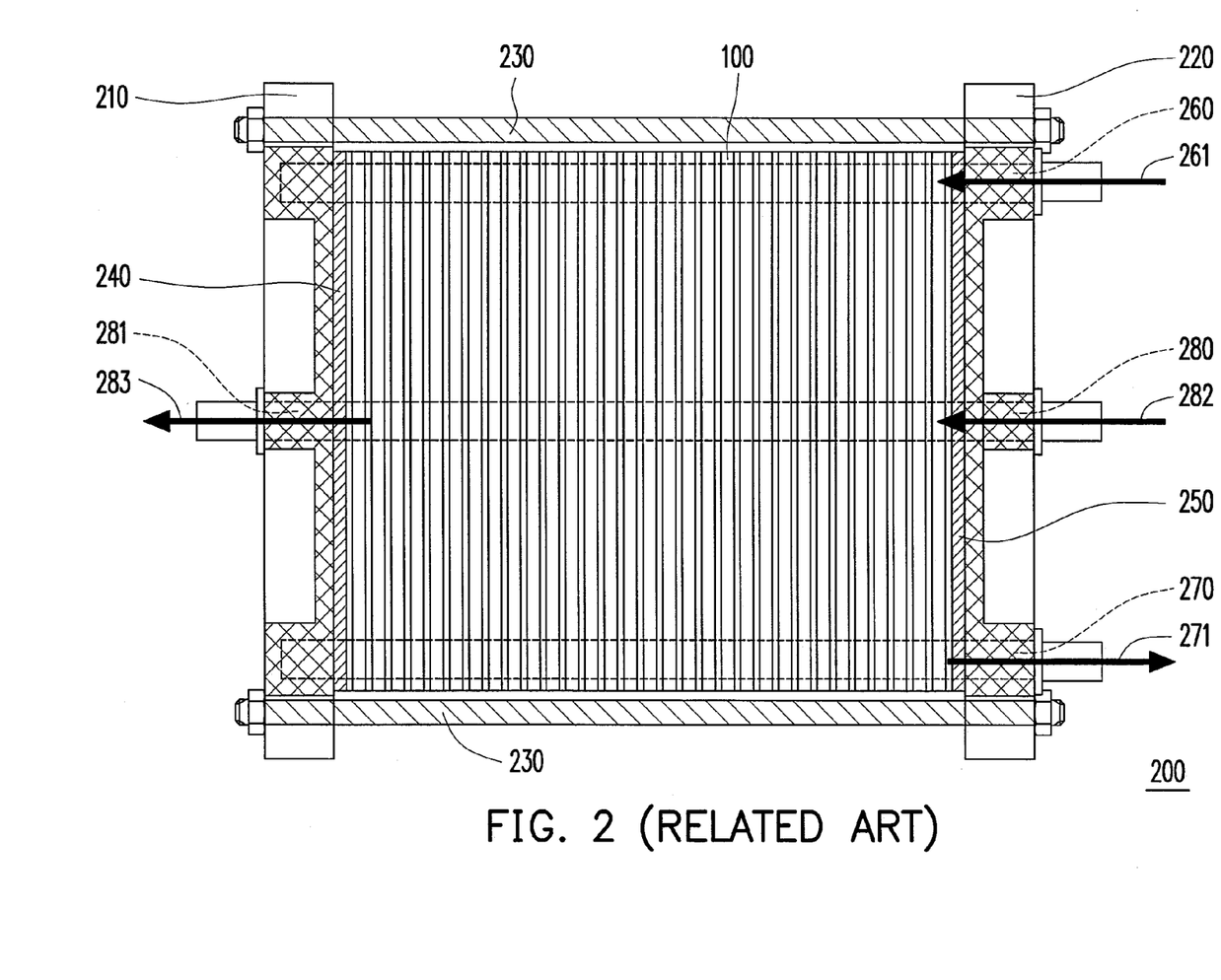
FIG. 2 is a side view of a conventional fuel cell stack.

According to the above description, it is known that the fuel cell 100 generates power through the electrochemical reaction between the hydrogen and the oxygen, and a reaction outcome is clean water, which will not cause pollution to the environment. Since the fuel cell has advantages of high efficiency and fast response, etc, it is regarded as one of the alternative energy sources of the future. Moreover, the single fuel cell 100 can be stacked in serial to form a fuel cell stack as that shown in FIG. 2, so as to increase an output voltage to meet different power demands and applications. FIG. 2 is a side view of a conventional fuel cell stack, in which two end plates 210 and 220 located at two sides and a plurality of fastening elements 230 are used to tightly stack a plurality of single fuel cells 100, reaction fluid 261 enters the fuel cell stack 200 through a reaction fluid inlet manifold 260 and is uniformly distributed to each of the single fuel cell 100. The electrons generated by the electrochemical reaction are conducted to external for utilization through current collectors 240 and 250 located at two sides of the fuel cell stack 200, and reacted fluid 271 flows outside the fuel cell stack 200 through a reaction fluid outlet manifold 270. Moreover, cooling fluid 282 enters the fuel cell stack 200 through a cooling fluid inlet manifold 280 to maintain a suitable temperature of the fuel cell stack 200 during operation, and cooled fluid 283 can be smoothly exhausted from the fuel cell stack 200 through a cooling fluid outlet manifold 281.

One of key factors that influences a performance of the fuel cell stack 200 is a clamping pressure provided by the two end plates 210 and 220 and the fastening elements 230 when the fuel cell stack 200 is assembled. Referring to FIG. 1 and FIG. 2, when the clamping pressure is too great, the MEA 110 is deformed or even damaged due to the pressure, which may cause a decline of a transmission capacity of the hydrogen ions. When the clamping pressure is inadequate, an interface contact resistance between the MEA 110 and the bipolar plates 140 and 150 is increased, which may also cause a decline of the performance of the fuel cell stack 200. Another factor that influences the performance of the fuel cell stack 200 is stability of chemical/electrochemical characteristics of a material of the end plates 210 and 220. The reaction fluid outlet/inlet manifolds 270 and 260 and the cooling fluid outlet/inlet manifolds 281 and 280 of the end plates 210 and 220 are mainly used for guiding the reaction fluid 261 and 271 and the cooling fluid 282 and 283 with a temperature of 60-80° C. and a relative humidity of more than 90%, Unstable chemical/electrochemical characteristics of the material of the end plates 210 and 220 may lead to corrosion and exfoliation of the manifold surface, and exfoliations can block the flow channels 160 and 170, and accordingly the MEA 110 is contaminated and the performance of the fuel cell stack 200 is decreased.

In summary, the end plates 210 and 220 and the fastening elements 230 are not only required to provide a uniform clamping pressure when the single fuel cells are assembled, but also the end plates 210 and 220 are required to have a high rigidity and a stable chemical/electrochemical characteristic under the operation temperature, humidity and pressure of the fuel cell stack 200, so as to maintain the performance of the fuel cell stack 200 and prolong a lifespan of the fuel cell stack 200.

SUMMARY OF THE INVENTION

The present invention is directed to a fuel cell stack, which can maintain a stable fuel cell performance.

The present invention provides a fuel cell stack including a first end plate, a second end plate, at least a fuel cell, a first current collector and a second current collector. The first end plate includes a first end plate structure component and a first end plate manifold component, wherein the first end plate manifold component is combined with the first end structure component, and a rigidity of the first end plate structure component is greater than that of the first end plate manifold component. The first end plate manifold component has at least one first open manifold and at least one first close manifold, wherein the first open manifold is connected to external. The second end plate includes a second end plate structure component and a second end plate manifold component, wherein the second end plate structure component has at least one second through hole, and the second end plate manifold component is combined with the second end plate structure component. The first end plate manifold component and the second end plate manifold component are disposed between the first end plate structure component and the second end plate structure component, and a rigidity of the second end plate structure component is greater than that of the second end plate manifold component. The second end plate manifold component has at least one second open manifold and at least one second close manifold, wherein the second open manifold is connected to external. The at least one fuel cell is disposed between the first end plate manifold component and the second end plate manifold component, and the at least one fuel cell has a plurality of flow channels respectively connected to the corresponding first open manifold, the first close manifold, the second open manifold and the second close manifold. The first current collector is disposed between the first end plate manifold component and the at least one fuel cell. The second current collector is disposed between the second end plate manifold component and the at least one fuel cell.

In the present invention, two or more materials are used to form composite end plates, which can maintain a high rigidity and a stable chemical/electrochemical characteristic under an operation temperature, humidity and pressure of the fuel cell stack. Moreover, the composite end plates having characteristics of good corrosion resistance, electrical insulation, low heat conduction loss and light-weight, etc. can be designed according to different material characteristics, so as to maintain and improve the performance of the fuel cell stack.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 3:
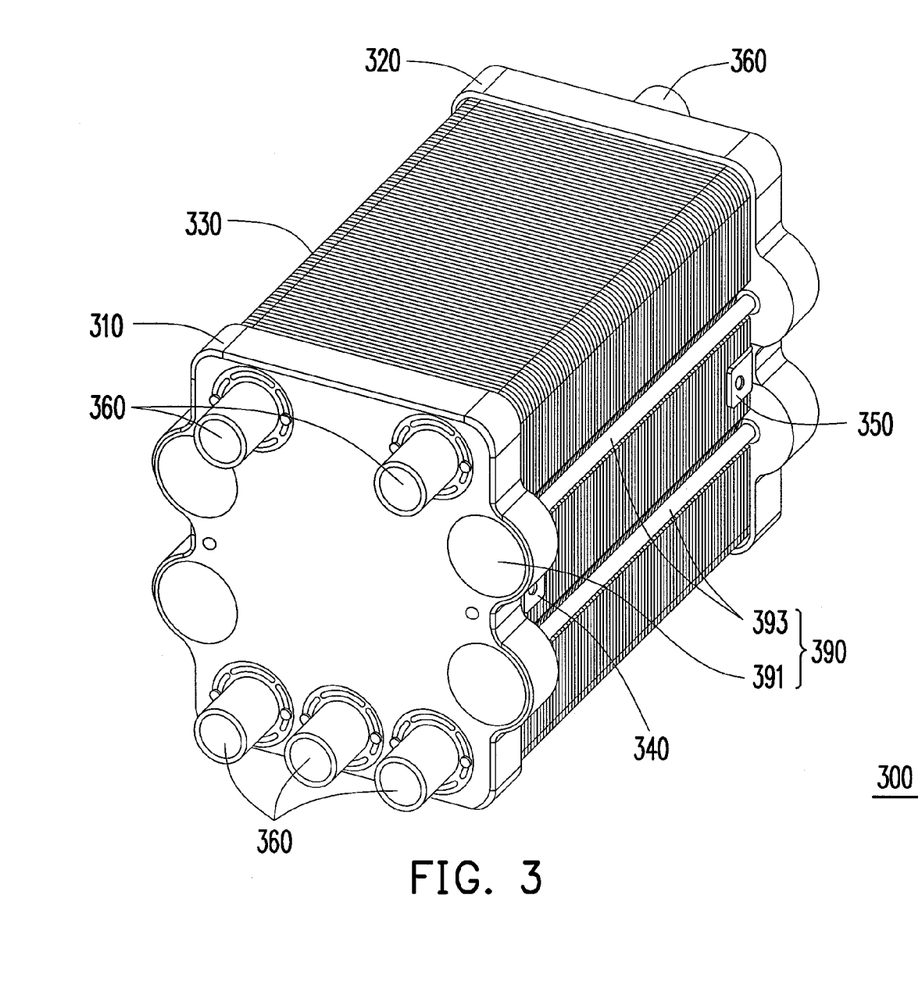
FIG. 3 is a three-dimensional view of a fuel cell stack according to an embodiment of the present invention.
Figure 4:
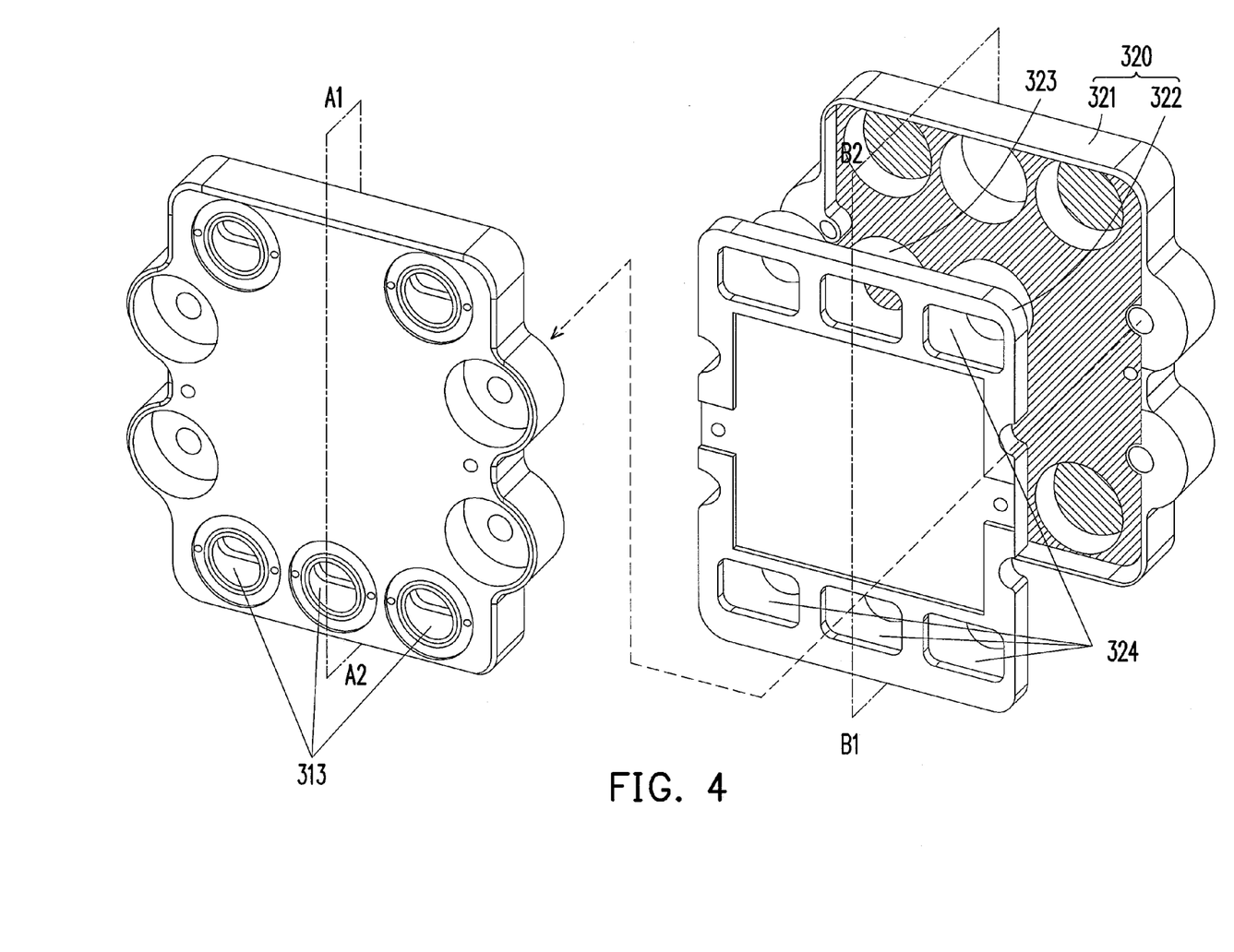
FIG. 4 is a three-dimensional view of end plates of a fuel cell stack according to an embodiment of the present invention.
Figure 5:
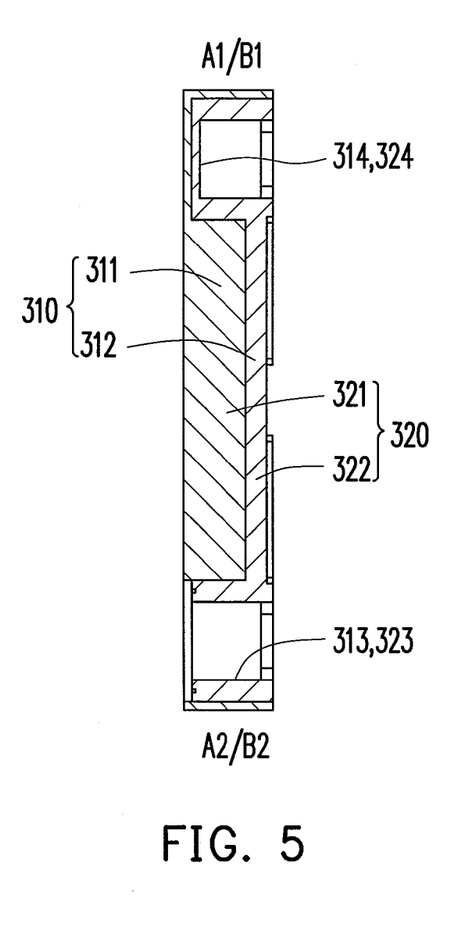
FIG. 5 is a cross-sectional view of end plates of FIG. 4 along a plane A1A2/B1B2.

FIG. 3 is a three-dimensional view of a fuel cell stack according to an embodiment of the present invention. FIG. 4 is a three-dimensional view of end plates of the fuel cell stack according to an embodiment of the present invention, in which a first end plate 310 is represented by a comprehensive diagram, and a second end plate 320 is represented by an exploded diagram. FIG. 5 is a cross-sectional view of the end plates of FIG. 4 along a plane A1A2/B1B2. Referring to FIG. 3, FIG. 4 and FIG. 5, the first end plate 310 includes a first end plate structure component 311 and a first end plate manifold component 312, wherein the first end structure component 311 is combined with the first end plate manifold component 312, and a rigidity of the first end plate structure component 311 is greater than that of the first end plate manifold component 312. The first end plate manifold component 312 has at least one first open manifold 313 and at least one first close manifold 314, wherein the first open manifold 313 is connected to external for leading reaction fluid or cooling fluid required during the operation of the fuel cells.

The second end plate 320 includes a second end plate structure component 321 and a second end plate manifold component 322, wherein the second end plate structure component 321 has at least one second through hole 325, and the second end plate structure component 321 is combined with the second end plate manifold component 322, and a rigidity of the second end plate structure component 321 is greater than that of the second end plate manifold component 322. The first end plate manifold component 312 and the second end plate manifold component 322 are disposed between the first end plate structure component 311 and the second end plate structure component 321. The second end plate manifold component 322 has at least one second open manifold 323 and at least one second close manifold 324, wherein the second open manifold 323 is connected to external for leading the reaction fluid or the cooling fluid required during the operation of the fuel cells.

The fuel cell stack 300 of the present embodiment includes at least one fuel cell 330, a first current collector 340 and a second current collector 350. A quantity of the fuel cells 330 is not limited by the present invention, and in the present embodiment, a plurality of stacked fuel cells 330 is illustrated for description. The stacked fuel cells 330 are disposed between the first end plate manifold component 312 and the second end plate manifold component 322, and the fuel cells 330 has a plurality of flow channels respectively connected to the corresponding first open manifold 313, the first close manifold 314, the second open manifold 323 and the second close manifold 324, so that the reaction fluid or the cooling fluid came from the external of the fuel cell stack 300 can be uniformly distributed to each of the fuel cells 330. The first current collector 340 is disposed between the first end plate manifold component 312 and the fuel cells 330, and the second current collector 350 is disposed between the second end plate manifold component 322 and the fuel cells 330. The first current collector 340 and the second current collector 350 can conduct electrons generated by an electrochemical reaction of the reaction fluid to the external of the fuel cell stack 300 for utilization.

Moreover, a material of the first end plate structure component 311 or the second end plate structure component 321 can be metal, for example, one of a group consisting of ferrous alloy, non-ferrous alloy, aluminium alloy, titanium alloy and stainless steel, which can provide a high mechanical rigidity required by the first end plate 310 and the second end plate 320. Since the first end plate manifold component 312 and the second end plate manifold component 322 directly contact the current collectors 340 and 350 and the reaction fluid or the cooling fluid, a material thereof is preferably a polymer material with features of stable chemical/electrochemical characteristic, good electrical insulation property, low heat loss, and good corrosion resistance, such as one of a group consisting of rubber, plastics and fiber composites.

Figure 6:
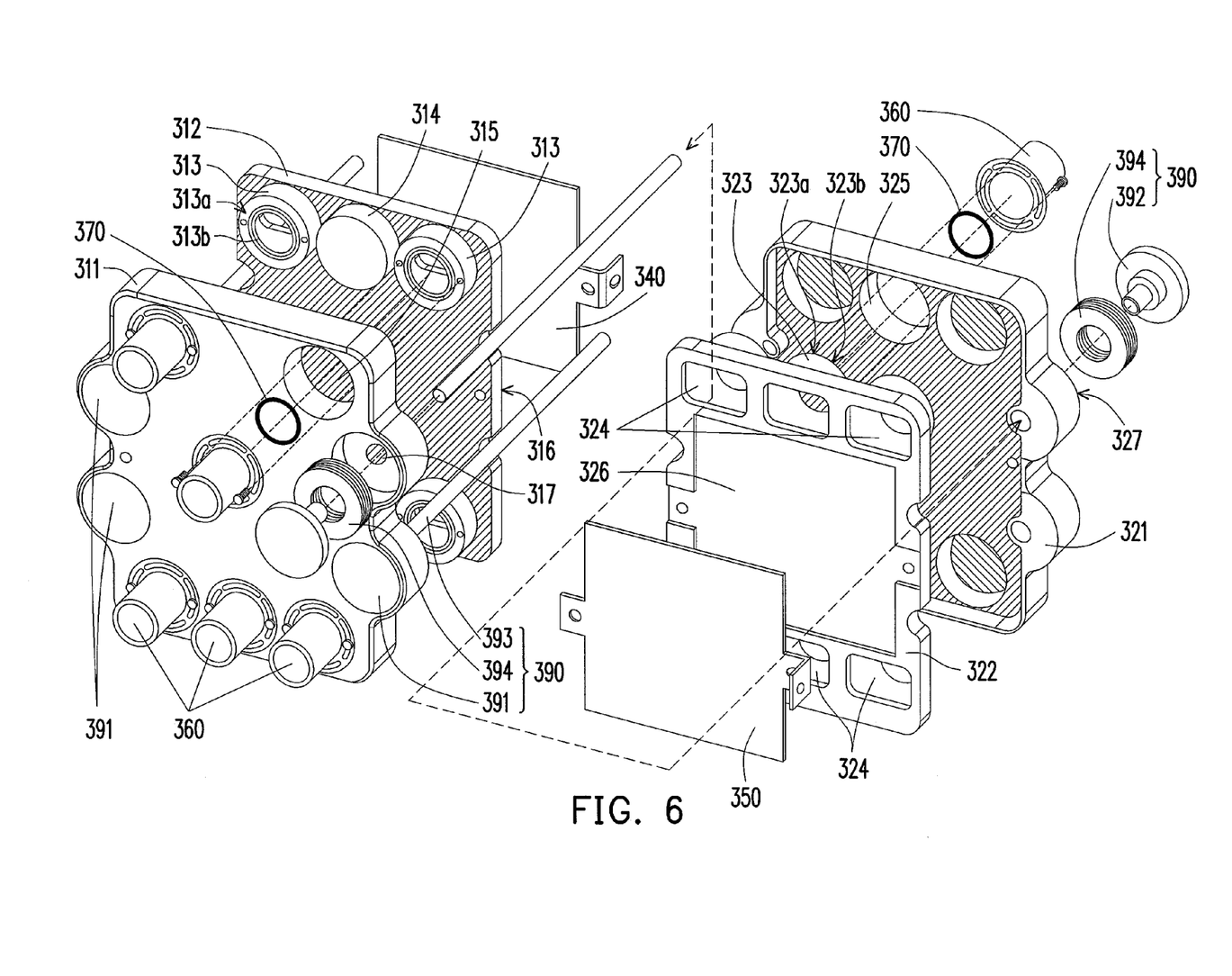
FIG. 6 is an exploded view of end plates of fuel cells and a compression assembly mechanism according to an embodiment of the present invention.
Figure 7:
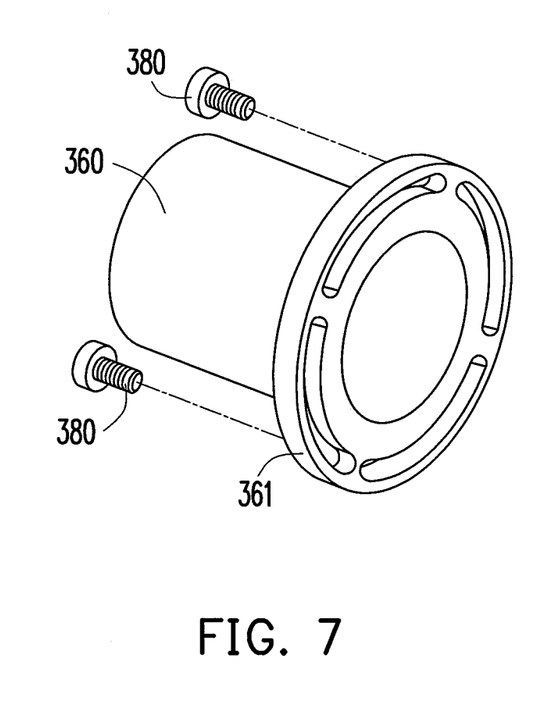
FIG. 7 is a three-dimensional view of an external pipeline according to an embodiment of the present invention.

FIG. 6 is an exploded view of the end plates of the fuel cells and a compression assembly mechanism according to an embodiment of the present invention. FIG. 7 is a three-dimensional view of an external pipeline 360 of the end plates according to an embodiment of the present invention. Referring to FIG. 6 and FIG. 7, the fuel cell stack 300 has a plurality of external pipelines 360 respectively connected to the corresponding first open manifolds 313 and the second open manifolds 323, wherein each of the first open manifolds 313 and each of the second open manifolds 323 respectively have an end plane 313a and an end plane 323a, which are used for combining with the corresponding external pipeline 360. The end planes 313a and 323a respectively has a ring-shape groove 313b and a ring-shape groove 323b, which are used for accommodating a plurality of O-rings 370 disposed between the end planes 313a and 323a and the external pipelines 360, so as to provide a good gastight effect. Moreover, each of the external pipelines 360 has a flange 361. In the present embodiment, the flange 361 has at least one arc hole, so that a plurality of screws 380 can be locked between the external pipeline 360 and the corresponding end planes 313a and 323a, and the external pipeline 360 can be rotated to facilitate combining the external pipelines.

The fuel cell stack 300 of the present embodiment includes at least one clamping assembly 390, which is used for exerting a clamping load to an outer edge of the first end plate structure component 311 and an outer edge of the second end plate structure component 321, so as to sequentially clamp the first end plate structure component 311, the first end plate manifold component 312, the first current collector 340, the at least one fuel cell 330, the second current collector 350, the second end plate manifold component 322 and the second end plate structure component 321. The clamping assembly 390 includes a first load component 391, a second load component 392, a connector 393 and two elastic components 394, wherein the first load component 391 and the second load component 392 are respectively disposed at the outer edge of the first end plate structure component 311 and the outer edge of the second end plate structure component 321; the connector 393 penetrates through the first end plate structure component 311 and the second end plate structure component 321 and connects the first load component 391 and the second load component 392; while the elastic components 394 are respectively disposed between the first load component 391 and the first end plate structure component 311, and between the second load component 392 and the second end plate structure component 321. The elastic component 394 can be a compressible component, for example, a disk-type spring or a compression spring, which is used for sustaining the clamping load.

The first end plate manifold component 312 and the second end plate manifold component 322 respectively have concave parts 316 and 326 at a side facing to the fuel cell 330, which are respectively used for accommodating the first current collector 340 and the second current collector 350 during assembling, so that the first end plate manifold component 312 and the first current collector 340 can commonly lean against one side of the fuel cell 330, and the second end plate manifold component 322 and the second current collector 350 can commonly lean against another side of the fuel cell 330. Moreover, the outer edge of the first end plate structure component 311 and the outer edge of the second end plate structure component 321 respectively have concaves 317 and 327, which are respectively used for accommodating the first load component 391 and the second load component 392 during the assembling.

Figure 8:
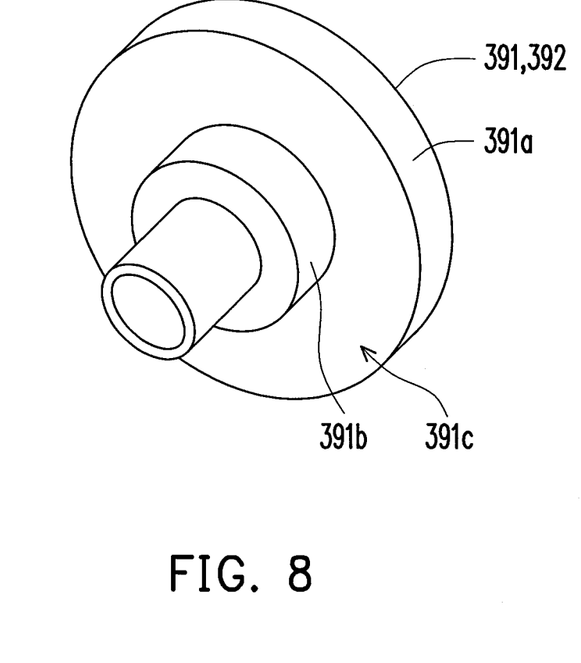
FIG. 8 is a three-dimensional view of a load component according to an embodiment of the present invention.

FIG. 8 is a three-dimensional view of a load component according to an embodiment of the present invention. As shown in FIG. 8, the load component 391 or 392 has a bottom plate 391a and a stop block 391b, wherein the bottom plate 391a has a first supporting surface 391c, which is used for supporting the corresponding elastic component 394, and sustaining a reacting force generated when the elastic component 394 is compressed. The stop block 391b is disposed on the first supporting surface 391c, which is used for leaning against the first end plate structure component 311 or the second end plate structure component 321 when the elastic component 394 is excessively pressed, so as to protect the elastic component 394, and avoid damage of the elastic component 394 caused by improper assembling pressure. The step block 391b can include an inner thread hole, which is used for locking the connector 393 during the assembling.

Figure 9:
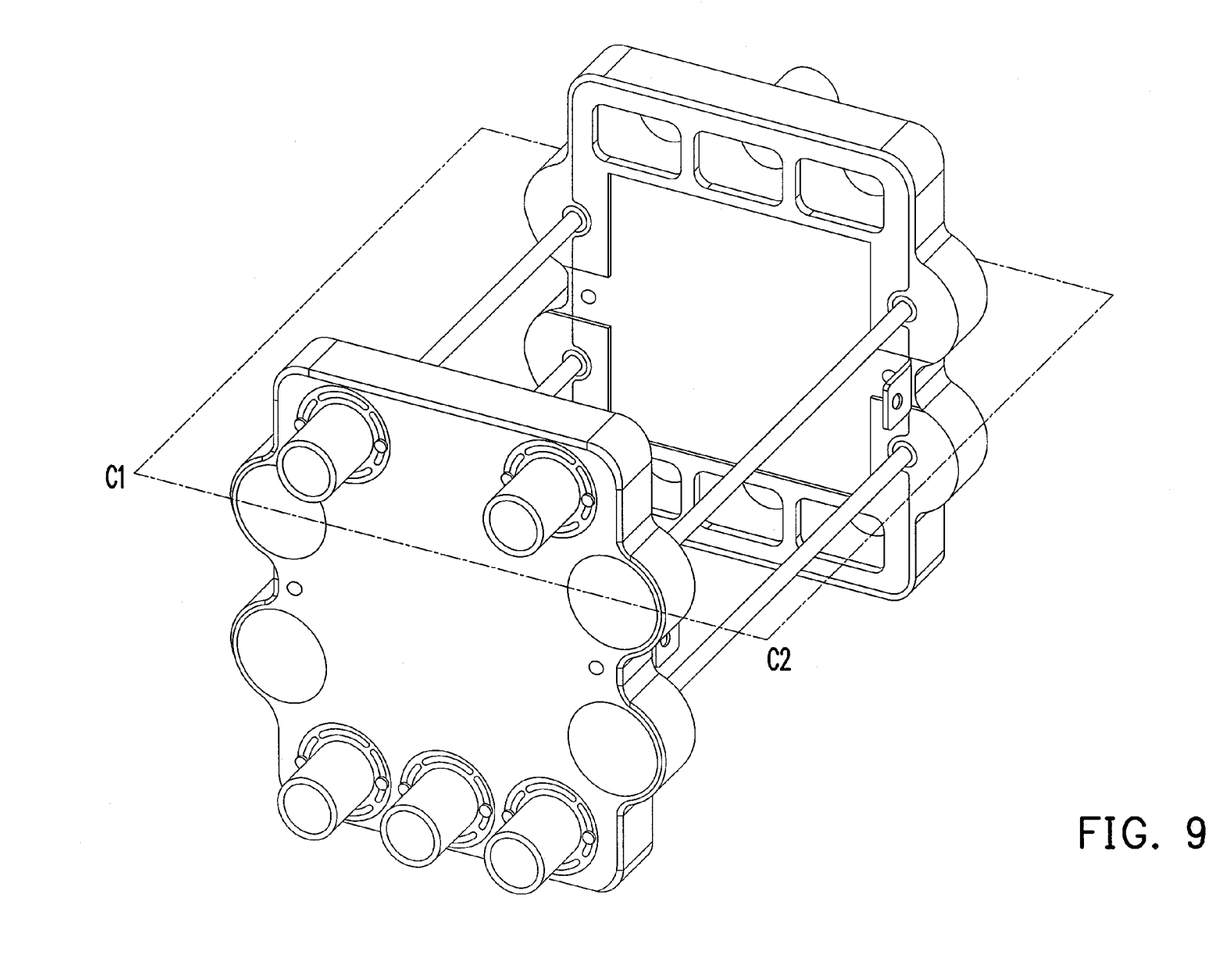
FIG. 9 is a three-dimensional view of end plates of fuel cells and a compression assembly mechanism according to an embodiment of the present invention.
Figure 10:
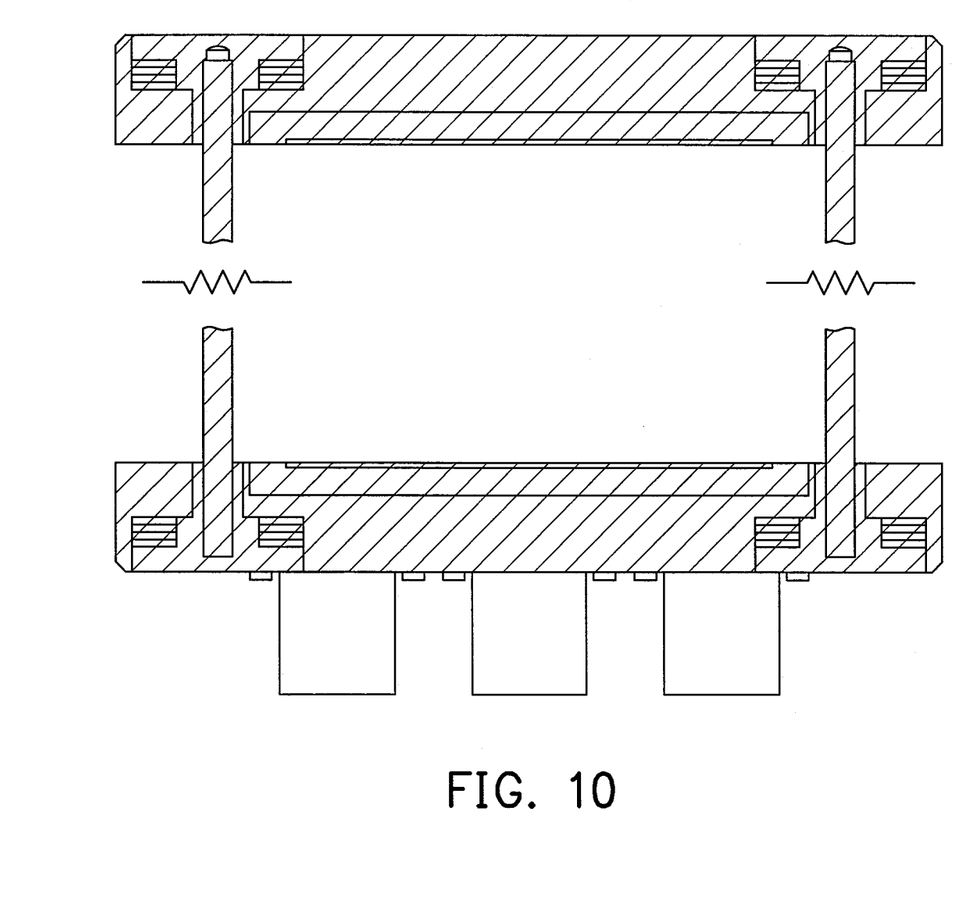
FIG. 10 is a cross-sectional view of end plates of fuel cells and a compression assembly mechanism of FIG. 9 along a plane C1C2.

In addition, the first end plate 310 of the fuel cell stack 300 is formed by combining the first end plate structure component 311 and the first end plate manifold component 312. The first end plate structure component 311 has at least one first through hole 315. When the fuel cells are assembled, the first open manifold 313 is disposed in the corresponding first through hole 315 for connecting to the external, and can be combined with the external pipeline 360. The first close manifold 314 extends into the first end plate structure component 311 to form a circumfluence chamber, so that the reaction fluid can be uniformly distributed to each of the fuel cells. The second end plate structure component 321 and the second end plate manifold component 322 are assembled in a same approach. The second open manifold 323 is disposed in the corresponding second through hole 325 for connecting to the external, and the second close manifold 324 extends into the second end plate structure component 321 to form the circumfluence chamber. In the present embodiment, according to different material characteristics of the components that form the first end plate 310 and the second end plate 320, by suitably selecting and combining the materials, the first end plate 310 and the second end plate 320 may simultaneously have the advantages of high mechanical rigidity, electrical insulation, and stable chemical/electrochemical characteristic. Besides combining the two types of the components to form the first end plate 310 and the second end plate 320, a layer of heat-insulating material can further be added during the assembling, so that the first end plate 310 and the second end plate 320 may have a heat preservation function. Accordingly, a heat conduction loss is reduced, an operation temperature of the fuel cells is maintained and a performance of the fuel cells is stabilized. FIG. 9 is a three-dimensional view of the end plates of the fuel cells and a compression assembly mechanism according to an embodiment of the present invention. FIG. 10 is a cross-sectional view of FIG. 9 along a plane C1C2.

Figure 11:
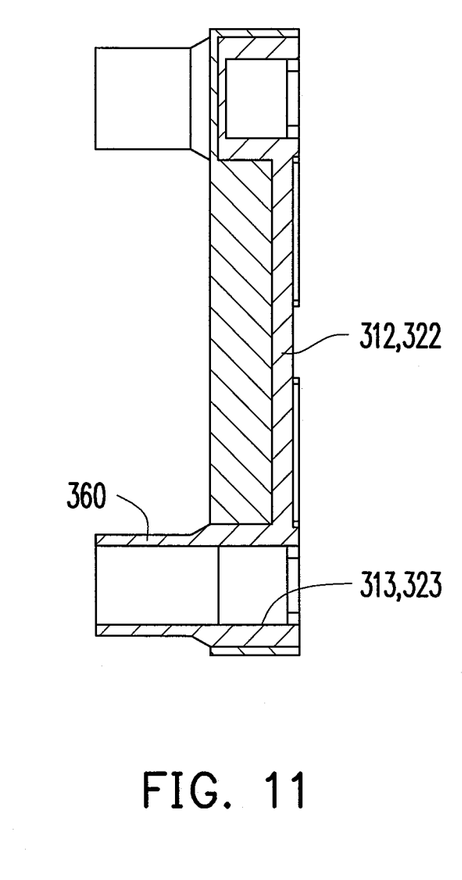
FIG. 11 is a cross-sectional view of end plates of fuel cells along a plane A1A2/B1B2 plane according to another embodiment of the present invention.

FIG. 11 is a cross-sectional view of the end plates of the fuel cells along the plane A1A2/B1B2 according to another embodiment of the present invention. The external pipelines 360 are not combined to the first and the second end plate manifold components 312 and 322 through a locking approach, but are formed integrally with the corresponding first open manifold 313 or the second open manifold 323, so as to avoid a follow-up locking procedure during the assembling. Moreover, a gas leakage problem between the external pipeline 360 and the first and the second end plate manifold components 312 and 322 can be avoided, which may facilitate the assembling and utilization.

Figure 12:
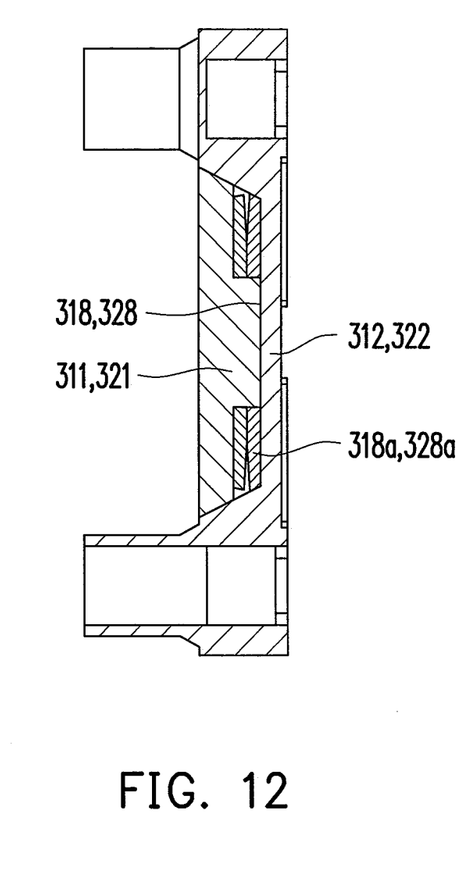
FIG. 12 is a cross-sectional view of end plates of fuel cells along a plane A1A2/B1B2 according to still another embodiment of the present invention.

FIG. 12 is a cross-sectional view of the end plates of the fuel cells along the plane A1A2/B1B2 according to still another embodiment of the present invention. In the present embodiment, the first end plate manifold component 312 and the second end plate manifold component 322 respectively a first concave 318 and a second concave 328, and the first end plate structure component 311 and the second end plate structure component 321 are respectively inlaid to the first concave 318 and the second concave 328. In coordination with such assembling method and the elastic components 318a and 328a disposed between the first and the second end plate manifold components 312 and 322 and the first and the second end plate structure components 311 and 321, delivery of integral clamping pressure is achieved.

In summary, by selecting the materials of the end plate structure components and the end plate manifold components, composite end plates having advantages of high rigidity, good corrosion resistance, electrical insulation, stable chemical/electrochemical characteristic and light-weight, etc. are formed. Moreover, a layer of heat-insulating material can further be added to the end plate to reduce a heat conduction loss during the operation of the fuel cells, so as to maintain a stable performance of the fuel cells, and improve a durability of the fuel cells. The assembling mechanism of the present invention can provides a suitable and uniform clamping pressure, so as to reduce an interface contact resistance of the fuel cells, and improve the performance of the fuel cells. Moreover, the components of the present invention have simple designs, so that a fabrication cost of the components can be reduced through a mass production. In addition, the components are easy to be assembled, and are suitable for designs of all types of the fuel cell stacks, which are convenient for applications.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fuel cell stack, comprising:
    a first end plate, comprising:
        a first end plate structure component; and
        a first end plate manifold component, combined with the first end plate structure component, a rigidity of the first end plate structure component being greater than a rigidity of the first end plate manifold component, the first end plate manifold component having at least one first open manifold, at least one first close manifold and a first concave, wherein the first end plate structure component is inlaid to the first concave;
    a second end plate, comprising:
        a second end plate structure component; and
        a second end plate manifold component, combined with the second end plate structure component, the first end plate manifold component and the second end plate manifold component being disposed between the first end plate structure component and the second end plate structure component, a rigidity of the second end plate structure component being greater than a rigidity of the second end plate manifold component, the second end plate manifold component having at least one second open manifold and at least one second close manifold;
    at least a fuel cell, disposed between the first end plate manifold component of the first end plate and the second end plate manifold component of the second end plate, and having a plurality of flow channels respectively connected to the corresponding first open manifold, the first close manifold, the second open manifold and the second close manifold;
    a plurality of external pipelines respectively connected to the first open manifold and the second open manifold for leading reaction fluid or cooling fluid required by the fuel cell, wherein the first open manifold and the second open manifold respectively separate the corresponding first end plate structure component and the corresponding second end plate structure component from the reaction fluid or the cooling fluid;
    a first current collector, disposed between the first end plate manifold component and the at least one fuel cell; and
    a second current collector, disposed between the second end plate manifold component and the at least one fuel cell.

2. The fuel cell stack as claimed in claim 1, wherein a material of the first end plate structure component or the second end plate structure component is a metal material.

3. The fuel cell stack as claimed in claim 2, wherein the material of the first end plate structure component or the second end plate structure component is selected from a group consisting of ferrous alloy, non-ferrous alloy, aluminum alloy, titanium alloy and stainless steel.

4. The fuel cell stack as claimed in claim 1, wherein a material of the first end plate manifold component or the second end plate manifold component is a polymer material.

5. The fuel cell stack as claimed in claim 4, wherein the material of the first end plate manifold component or the second end plate manifold component is selected from a group consisting of rubber, plastics and fiber composites.

6. The fuel cell stack as claimed in claim 1, wherein the first end plate manifold component and the second end plate manifold component respectively have a concave part at a side facing to the at least one fuel cell, which are respectively used for accommodating the first current collector and the second current collector, so that the first end plate manifold component and the first current collector commonly lean against the at least one fuel cell, and the second end plate manifold component and the second current collector commonly lean against the at least one fuel cell.

7. The fuel cell stack as claimed in claim 1, wherein each of the first open manifolds and each of the second open manifolds respectively have an end plane for combining the corresponding external pipeline.

8. The fuel cell stack as claimed in claim 7, further comprising a plurality of O-rings respectively disposed between the end planes and the corresponding external pipelines, and each of the end planes having a ring-shape groove for accommodating the O-ring.

9. The fuel cell stack as claimed in claim 7, wherein each of the external pipelines has a flange locked on the end plane of the corresponding first open manifold or the corresponding second open manifold.

10. The fuel cell stack as claimed in claim 9, further comprising a plurality of screws locked between the external pipelines and the corresponding end planes.

11. The fuel cell stack as claimed in claim 1, wherein each of the external pipelines and the corresponding first open manifold or the corresponding second open manifold are formed integrally.

12. The fuel cell stack as claimed in claim 1, further comprising at least one clamping assembly for exerting a clamping load to an outer edge of the first end plate structure component and an outer edge of the second end plate structure component, so as to clamp the first end plate structure component, the first end plate manifold component, the first current collector, the at least one fuel cell, the second current collector, the second end plate manifold component and the second end plate structure component together.

13. The fuel cell stack as claimed in claim 12, wherein the clamping assembly comprises:
   a first load component and a second load component, respectively disposed at the outer edge of the first end plate structure component and the outer edge of the second end plate structure component;
   a connector, penetrating through the first end plate structure component and the second end plate structure component, and connecting the first load component and the second load component; and
   two elastic components, respectively disposed between the first load component and the first end plate structure component, and between the second load component and the second end plate structure component.

14. The fuel cell stack as claimed in claim 13, wherein the elastic components are disk-type springs or compression springs.

15. The fuel cell stack as claimed in claim 13, wherein an outer surface of the first end plate structure component includes a first cavity for accommodating the first load component, and an outer surface of the second end plate structure component includes a second cavity for accommodating the second load component.

16. The fuel cell stack as claimed in claim 13, wherein the first load component or the second load component comprises:
   a bottom plate, having a first supporting surface for supporting the corresponding elastic component; and
   a stop block, disposed on the first supporting surface of the bottom plate, for leaning against the first end plate structure component or the second end plate structure component when the elastic component is pressed.

17. The fuel cell stack as claimed in claim 1, wherein the first end plate structure component has at least one first through hole, the first open manifold is located in the first through hole.

18. The fuel cell stack as claimed in claim 17, wherein the second end plate structure component has at least one second through hole, the second open manifold is located in the second through hole.

19. The fuel cell stack as claimed in claim 1, wherein the second end plate manifold component has a second concave, and the second end plate structure component is inlaid to the second concave.

20. The fuel cell stack as claimed in claim 19, further comprising two elastic components respectively disposed between the first end plate manifold component and the first end plate structure component, and between the second end plate manifold component and the second end plate structure component.

21. The fuel cell stack as claimed in claim 1, wherein the first close manifold extends into the first end plate structure component to form a circumfluence chamber.

22. The fuel cell stack as claimed in claim 1, wherein the second close manifold extends into the second end plate structure component to form a circumfluence chamber.

* * * * *